United States Patent
Hellman et al.

(10) Patent No.: US 8,034,205 B2
(45) Date of Patent: Oct. 11, 2011

(54) METHOD FOR MANUFACTURING A MULTIMATERIAL COMPONENT OR CONSTRUCTION

(75) Inventors: Jussi Hellman, Helsinki (FI); Jari Liimatainen, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 142 days.

(21) Appl. No.: 12/087,733

(22) PCT Filed: Jan. 19, 2007

(86) PCT No.: PCT/FI2007/050031
§ 371 (c)(1),
(2), (4) Date: Sep. 19, 2008

(87) PCT Pub. No.: WO2007/085694
PCT Pub. Date: Aug. 2, 2007

(65) Prior Publication Data
US 2009/0044898 A1    Feb. 19, 2009

(30) Foreign Application Priority Data
Jan. 25, 2006   (FI) .................................. 20060071

(51) Int. Cl.
*B29C 65/00*   (2006.01)
(52) U.S. Cl. .................. 156/196; 156/308.2; 156/71
(58) Field of Classification Search ............... 156/308.2, 156/71
See application file for complete search history.

(56) References Cited

U.S. PATENT DOCUMENTS
6,123,279 A    9/2000   Stafford et al.
6,523,767 B1   2/2003   Ramesohl FOREIGN PATENT DOCUMENTS
| DE | 197 21 637 A1 | 11/1998 |
| GB | 1 480 057 A | 7/1977 |
| JP | A 5-317731 | 12/1993 |
| JP | A 5-317732 | 12/1993 |
| JP | A 6-79187 | 3/1994 |
| JP | A 7-241484 | 9/1995 |
| JP | A 7-323238 | 12/1995 |
| JP | A 2001-165146 | 6/2001 |
| JP | A 2001-269589 | 10/2001 |
| JP | A 2004-160360 | 6/2004 |
| WO | WO 03/099443 A1 | 12/2003 |

*Primary Examiner* — Khanh P Nguyen
*Assistant Examiner* — Margaret Squalls
(74) *Attorney, Agent, or Firm* — Oliff & Berridge, PLC

(57) ABSTRACT

A method for manufacturing a multimaterial component or construction, whereby a body is formed in said method of a basic material and at least one piece formed of a wear resistant material being joined to said body at a temperature of not more than 80% of the lowest melting temperature of the materials to be joined. The invention also comprises the use of a multimaterial component or construction manufactured by means of said method.

10 Claims, 2 Drawing Sheets

A-A

A-A

Figure 1A:
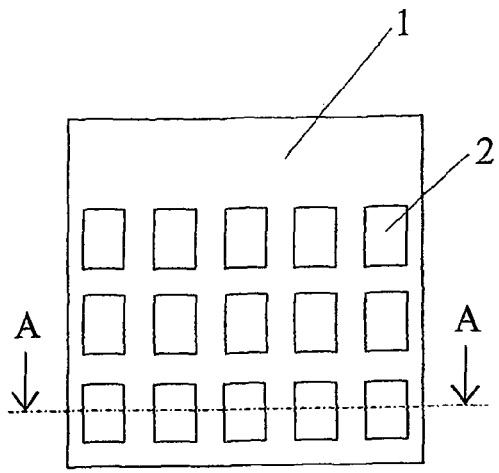

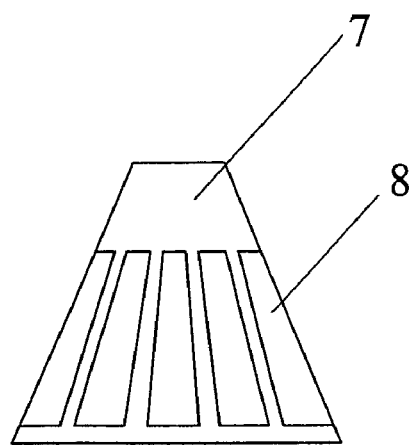
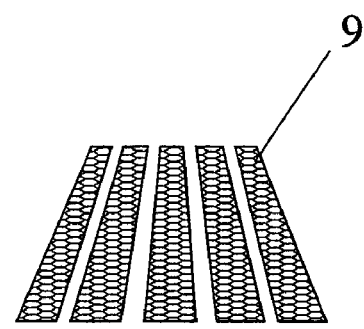
Fig. 4          Fig. 5
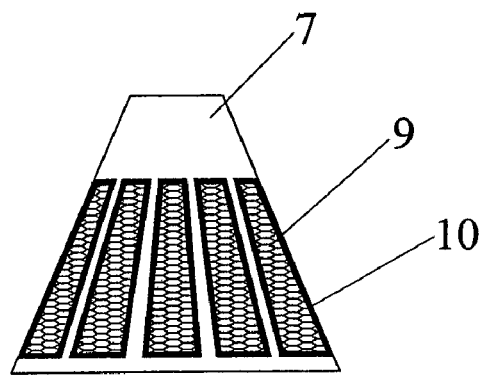
Fig. 6

METHOD FOR MANUFACTURING A MULTIMATERIAL COMPONENT OR CONSTRUCTION

The present invention relates to the manufacturing of multimaterial components or structures by manufacturing pieces at least of two different materials, said pieces being joined to each other for providing a multimaterial component or structure.

BACKGROUND

Wear resistant structures and components are used e.g. in equipment for reducing the size of rock, building or recycling material. In these processes, the material being crushed, pressed between the components or impacting the surfaces of the structures or components, cause wear on the surfaces of the components to an extent depending on the contact surface pressure, velocities, material characteristics of the component surfaces and on the physical characteristics of the material being crushed, e.g. the compressive strength and tribology characteristics. In other words, the movement of the material being crushed with respect to the surfaces of the components as well as the penetration of the material into the surface of the component have influence on the wear of the component: The material moving with respect to the surfaces of the components causes cutting and grooving, and the material penetrating the surface produces burrs on the affected area, which burrs are easily detached from the surface of the structures and components by breakage, fatigue or formation of cuttings as the events occur repeatedly. The intensity of the wear of the structures and components in their various sections and in the equipment generally is defined by the geometry of the equipment, the motion state of the components and the flow parameters of the material being crushed.

Attempts to increase the effective service life of the structures and components in general are generally made not only by influencing the geometry and internal flow conditions of the equipment, but in particular by selecting advantageous materials. The tribology characteristics of metallic wear protection materials of prior art are based e.g. on advantageous alloying of the relevant metals, and possible addition of particles, on manufacturing processes and further treatments, like heat treatments, whereby phases having better than usual resistance to wear phenomena will be formed in their microstructure as a combined effect of all these factors, said phases typically being hard but often having low toughness and fatigue resistance. As characteristics apart from tribology characteristics are required from the structures and components, they usually cannot be manufactured completely from the materials having the microstructure described above. On the other hand, also the control of the wear pattern of the structures and components, e.g. for maintaining the geometry and internal flow model of the equipment, may require that different portions of the structures and components are manufactured from materials different from each other.

The methods used in manufacturing multimaterial components must almost without exception be adapted according the requirements of all the materials forming the structure, whereby the characteristics achieved in each material fall short of the target level for the respective material, and the best possible performance of the structure or the component will not be reached. Another significant challenge is to maintain the dimensional and shape tolerances of the pieces or portions during assembly and the subsequent treatments, which will be jointly directed to the pieces or portions consisting of various materials and to the boundaries between them. Thereby the different behavior of the materials in contact with or joined to each other, e.g. different volumetric changes, can cause damage to the structures and components. The above mentioned requirements totally exclude a number of manufacturing methods or at least complicate the manufacturing processes unreasonably as far as commercial exploitation is concerned.

In the methods and wear parts in accordance with Patent publications JP5317731, JP5317732 and JP6079187 on the contrary, the aim is to manufacture structures having parts of low durability placed in a wear resistant frame and thus to selectively and locally increase the rate of wear, thereby controlling the surface shape of the wear parts.

In the wear parts disclosed in Patent publication JP2001165146, a material having better wear resistance is introduced for controlling the wear pattern, but only a joining method requiring strict shape and measure tolerances is disclosed for the purpose of manufacturing the desired structures, which in terms of cost-efficiency is not reasonable.

Further, according to patent publication JP7323238 the aim is to directly obtain the functionally most preferred form of wear parts during the assembly of the structures, by mounting exactly formed wear protection pieces to the component bodies, whereby the expensive multi-stage manufacturing process of both the body parts and the wear protection pieces cannot be avoided.

Patent publications JP2001269589 and U.S. Pat. No. 6,123,279 disclose wear parts correspondingly aiming at increasing wear resistance by mounting wear resistant material in the body of the wear part, but by using a geometrically shape-locking joint, which also requires applying technically demanding and cost-increasing design methods to wear protection materials which are difficult to work and shape, e.g. the hard metals according to the latter publication, to achieve the dimensional and shape accuracy required for the assembly.

Patent publication JP2004160360 also discloses, that the wear resistant part must be formed (grooved) in a certain way for joining, which is not technically and economically profitable for the wear resistant materials to be used in the method in accordance with the invention.

Patent publication WO 03/099443 A1 discloses a manufacturing method for multimaterial structures, where wear resistant material or materials are joined to a body part made of machineable material by means of hot isostatic pressing directly using a direct diffusion joint or by using powder material added between the body and the wear resistant pieces. The gas-tight encapsulating of the structure required by the method, and the fact that at least partial machining is generally required for the pieces being joined, increase the work phases of the component manufacturing and increase the manufacturing costs too much for the utilization of the method to be economically profitable.

DESCRIPTION OF THE INVENTION

By means of the solution in accordance with the present invention, a multimaterial component or structure typically used as a wear part is provided by assembling pieces prepared using broad dimensional and shape tolerances into an entity that only during use will obtain its optimal shape in all aspects of functionality.

More precisely, the manufacturing method in accordance with the invention is characterized by what is stated in the characterizing part of Claim 1, and the use of the multimaterial component or structure manufactured by the method in accordance with the present invention is characterized by what is stated in the characterizing part of Claim 10.

Figure 2:
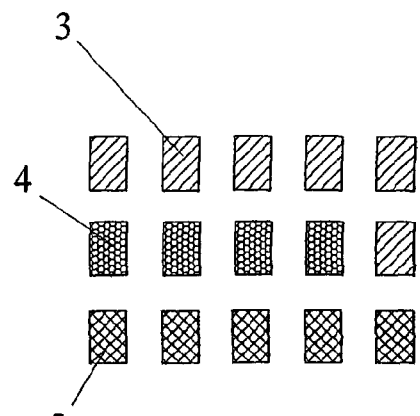
Figure 1B:
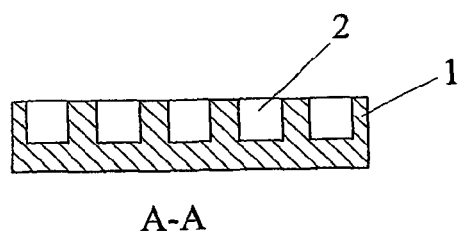
Figure 3A:
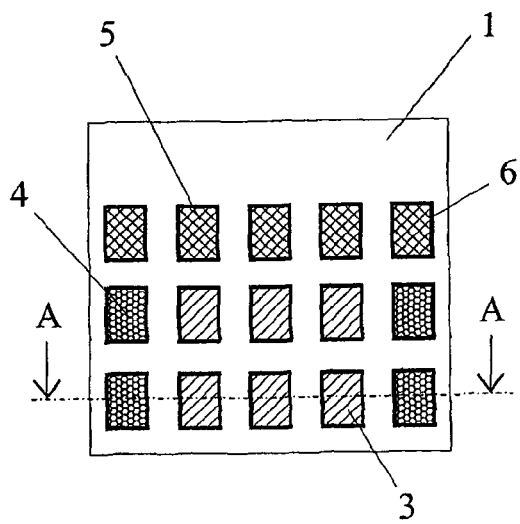
Figure 3B:
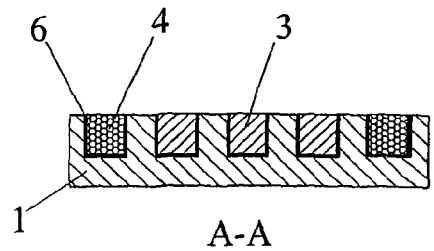

The invention will be described, by means of example, in more detail in the following with reference to the enclosed drawings, in which FIG. 1A shows a basic material body of a multimaterial component according to the invention, FIG. 1B is a cross-sectional view along the line A-A of the basic material body of FIG. 1A, FIG. 2 shows material pieces to be joined to the basic material body of FIGS. 1A and 1B, FIG. 3A shows pieces of FIGS. 1 and 2 joined with each other into a multimaterial component, FIG. 3B is a cross-sectional view along the line A-A of the multimaterial component of FIG. 3A, FIG. 4 shows an alternative basic material body of the multimaterial component according to the invention, FIG. 5 shows material pieces to be joined to the basic material body of FIG. 4, and FIG. 6 shows the pieces of FIGS. 4 and 5 joined to each other into a multimaterial component.

A basic material body 1 for a multimaterial component according to the present invention, shown in FIGS. 1A and 1B, comprises a piece formed of the basic material and having attachment points 2 for the pieces to be joined, the attachment points being prepared in advance at the determined locations on the basic material body, said attachment points being, in the example of FIGS. 1A and 1B, cuttings or cavities formed in the surface of the material. The body 1 is made of an iron based (Fe>50%) basic material including a relatively small amount of metal carbides, preferably less than 10%, using a manufacturing method suitable for the respective material, typically by casting, into a shape comprising the pre-prepared attachment points 2.

After the primary manufacture of the basic material body 1, and the possibly required after-treatments or machining, the body is heat treated under suitable process conditions for achieving as advantageous mechanical and tribology characteristics as possible for the basic material.

FIG. 2 shows pieces 3, 4 and 5 made of a wear resistant material, in the example of the Figure being manufactured of three different materials, each of the materials having characteristics at least partly different from each other. These pieces 3, 4 and 5 of wear resistant materials are manufactured by means of a manufacturing method well suitable for each material, respectively, e.g. by casting or some other method using melting or powder metallurgy. Pieces 3, 4 and 5 can be prepared directly into the final shape corresponding to their respective attachment points, or after the primary manufacturing they can be subjected to simple forming or machining treatments for achieving their final shape.

In the solution in accordance with the invention, the pieces 3, 4, and 5 made of wear resistant material are preferably made of an iron-based metal alloy having a carbon content of more than 1.9 percent by weight, hardness more than 50 HRC, preferably more than 54 HRC, and the fraction in the microstructure of said alloy of metal carbides with a diameter of more than 3 μm being more than 10%.

In the solution in accordance with the invention, the volume fraction of wear resistant material in the multimaterial component or structure to be manufactured is preferably more than 4%, and the volume of the largest single piece manufactured of wear resistant material is preferably not more than 25% of the total volume of the multimaterial component or structure.

After the primary and possible secondary working processes, the wear resistant pieces 3, 4 and 5 are heat treated, possibly at process conditions differing from each other, in order to provide the most advantageous mechanical and tribology characteristics for the pieces, Typically, the wear resistant pieces are of iron-based alloy including in their microstructure a larger volume fraction of hard phases than the basic material, the grain and particle size in those phases preferably being larger than that of the same or the other hard phases present in smaller amounts in the basic material.

Achieving the most advantageous mechanical and tribology characteristics both of the basic material body 1 and the wear resistant pieces 3, 4 and 5 means, in this connection, that for example the hardening and tempering temperatures of the iron based alloys differing from each other in terms of carbon content or other alloying elements are chosen depending on the material, so that the hardness and toughness attained by each material are as favorable as possible in the final object, in view of the load acting on each separate part of the multimaterial component.

FIGS. 3A and 3B show the final multimaterial component being formed by joining the wear resistant pieces 3, 4 and 5 to the basic material body 1 at optimal locations in view of the wear exerted on the multimaterial component and the characteristics of the wear resistant pieces. The wear resistant pieces 3, 4 and 5 have been joined to the basic material body 1 using a process in which the wear resistant pieces and the frame do not form a melt, and wherein, as a rule but not necessarily, a layer of additional material 6 of suitable thickness has been provided between the wear resistant pieces and the body, said additional material 6 having formed a joint both between the basic material body 1 and the wear resistant pieces 3, 4 and 5 and thus joined them all into a unitary multimaterial structure. A suitable additional material 6 is capable of forming a joint between all the wear resistant pieces of the relevant multimaterial structure and the body made of basic material, but has no tendency to form harmful reaction products either alone or with the joining materials under the conditions required by the joining process or in the service environment of the structure or component.

Besides the characteristics of the materials to be joined, it is also significant for the choice of additional material 6 that the thermodynamic and kinetic restrictions do not prevent the flow of additional material, so that although the body and the wear resistant pieces are manufactured with wide dimensional tolerances, and their shapes are often quite unfinished, the space between them will be completely or almost completely filled during the joining process. Taking all the above described restrictions into account, direct welding or joint casting using melts corresponding to the compositions of the pieces 1, 3, 4 or 5, for example, is not a possible method for joining.

The additional material 6 used in the solution according to the invention can advantageously be some suitable adhesive, the most preferable being epoxy-based adhesives, mixtures of rubber and epoxy and mixtures of polyurethane and epoxy. Any other totally or partly organic additional material by means of which the mechanical properties corresponding to the typical tolerances of the mentioned adhesives (e.g. strength, shear strength, Shore D hardness and toughness) can be achieved, is well suitable for use in the method in accordance with the invention. Alternatively, also a metallic or metal based solder alloy, most preferably a nickel or copper based solder or solder alloy, can be used in a process involving a temperature of not more than 80% of the lowest melting point temperature of the materials to be joined and an atmosphere having such partial pressures of gases, which favor the formation of a joint and a joint zone having the desired composition, microstructure and mechanical properties. The solution of the invention, however, is not limited to the use of additional material in joining the wear resistant material pieces to the basic material body.

FIGS. 4-6 show an alternative example of the solution in accordance with the invention, with a basic material body 7 having a conical form. Groove-shaped cavities 8 for joining the wear resistant pieces 9 have been provided in the basic material body 7 during manufacturing. The final multimaterial component is formed by joining the wear resistant pieces 9 by means of additional material 10 to the cavities formed in the basic material body 7.

The solution in accordance with the invention, however, is not limited to the use of additional material for joining the wear resistant pieces to the basic material body. The joint can also be provided by joining the pieces to each other e.g. by means of pressure and the resulting material flow, said pressure being generated mechanically or by a pressure transfer medium between the surfaces to be joined, in a process in which the temperature of the pieces to be joined is, on an average, not more than 60% of the lowest melting point temperature of the materials to be joined.

In the solution in accordance with the invention, the main function of the body material of the wear parts is to carry the mechanical load to which the components or parts are subjected during use, and to convey this load via the supporting surfaces to the frame of the relevant supporting equipment, whereby adequate strength, toughness and fatigue resistance are required of the material. The function of the wear resistant pieces in said multimaterial structures and components is mainly limited to the wear protection, and thus their characteristics can be chosen almost exclusively according to the characteristics profile required by that function. Thereby, in particular the hardness of the material and its ability to resist the propagation of the wear phenomena and the resulting material changes typical of the conditions of the respective application are the essential requirements. While propagating, the wear would typically cause grooving, cratering, burring, cutting or breaking of the structure or component material, but with a properly chosen and processed wear resistant material, the occurrence of those phenomena is minor in comparison with the body material of the structure and other materials in general use throughout the construction.

For the assembly of the wear resistant structure or component, the basic material body and the wear resistant pieces are cleaned of affected surface zones, such as oxidation zones caused by the primary manufacturing or subsequent working and/or machining, or impurities such as cutting fluid residues, which all can have a deteriorating effect on the properties of the joint zone formed when the body material, the wear resistant pieces and the additional material are assembled. To form a joint, a layer of a suitable thickness consisting of an additional material appropriate for the respective material pair is added between the body and the wear resistant pieces prepared as described above. The parameters of the joining process must be selected so that the characteristics of the additional material in the process conditions adequately enable wetting of the surfaces to be joined as well as flow of the additional material, so that the space between the body and the wear resistant pieces becomes as perfectly filled as possible. On the other hand, the conditions must not favor too strong reactions of the additional material with any of the materials involved in the joining.

In the solution in accordance with the invention, the characteristics of the wear resistant materials and the sizes of the pieces are preferably determined using the following formula:

((sum of the volumetric fractions of wear resistant materials in the volume of the entire structure)/ 5)+((HRC hardness of the wear resistant materials as the weighted average of their volumetric fractions)/10).

The index obtained from the formula should be larger than 6 and preferably larger than 10.

The multimaterial structures and components manufactured with the method in accordance with the invention are well suited for use in wear parts in demanding applications like for example in reducing the size of rock, building and/or recycling material.

Among others, the following advantages are provided by the solution in accordance with the present invention:
(i) By limiting the use of wear resistant material in structures and components only to areas where it is essential from the standpoint of wear protection, the manufacturing costs of the relevant products can be decreased.
(ii) The individual materials which are to be joined into a multimaterial component or structure using a solution in accordance with the invention can be manufactured separately using methods well suited for their manufacturing, whereby their desired technical properties can be achieved with higher reliability, and as a result, the performance and reliability of the structures and components will be improved.
(iii) By widening the dimensional and shape tolerances required by the assembly of the structures, significant savings can be achieved.
(iv) Through decreased use of wear resistant materials and the raw materials needed for manufacturing these, the ecological efficiency of the structures and components produced is improved.

The invention claimed is:

1. A method for manufacturing a multimaterial component or structure, said method comprising the following steps:
forming a body of a basic material by casting, said body comprising at least one attachment point for at least one piece of wear resistant iron based material;
forming the at least one piece of wear resistant iron based material by casting or power metallurgical method; and
joining the at least one piece of wear resistant iron based material to the at least one attachment point of the body formed of the basic material at a temperature (° C.) which is not more than 80% of the lowest melting point temperature (° C.) of the materials to be joined to form a multimaterial component or structure;
wherein the multimaterial component or structure satisfies the following formula:

$$A/5+B/10>6$$

where A represents:
$\Sigma$ (volumetric fraction of the at least one piece of wear resistant iron based material relative to the entire volume of the multimaterial component or structure), and
B represents the weighted average of the HRC hardness of the at least one piece of wear resistant iron based material, where the weighted average is calculated with respect to the volumetric fraction of the at least one piece of wear resistant iron based material in the total volume of wear resistant iron based material.

2. A method in accordance with claim 1, wherein the body formed of the basic material is manufactured of an iron based alloy (Fe>50%), wherein the portion of the metal carbides in the microstructure is less than 10 volume percent.

3. A method in accordance with claim 1, wherein the at least one piece of wear resistant iron based material is manufactured of a material having a carbon content of more than 1.9 weight percent, hardness of more than 50 HRC, and the microstructure of an alloy having a portion of more than 10 volume percent of metal carbides with a diameter of more than 3 μm.

4. A method in accordance with claim 1, wherein the volumetric fraction of the at least one piece of wear resistant iron based material in the multimaterial component or structure to be manufactured is more than 4%.

5. A method in accordance with claim 1, wherein the volume of the biggest single piece manufactured of the at least one piece of wear resistant iron based material is not more than 25% of the volume of the whole multimaterial component or structure.

6. A method in accordance with claim 1, wherein the body formed of the basic material and the at least one piece of wear resistant iron based material are joined with each other with an additional material.

7. A method in accordance with claim 6, wherein the additional material is an adhesive.

8. A method in accordance with claim 6, wherein the additional material is a metallic or metal based material.

9. A method for reducing the size of rock, building and/or recycling material, the method comprising:
   reducing the size of rock, building and/or recycling material by using the multimaterial component or structure manufactured in accordance with claim 1.

10. A method in accordance with claim 2, wherein the volumetric fraction of the at least one piece of wear resistant iron based material in the multimaterial component or structure to be manufactured is more than 4%.

* * * * *